United States Patent [19]

Cook et al.

[11] Patent Number: 5,197,069

[45] Date of Patent: Mar. 23, 1993

[54] METHOD AND SYSTEM FOR DETECTING AND RECOVERING FROM SWITCHING ERRORS

[75] Inventors: Thomas E. Cook, Hyde Park; Mark J. Fantacone, Wappingers Falls; Iwao Hatanaka, Poughkeepsie; Harry M. Yudenfriend, Wappingers Falls, all of N.Y.

[73] Assignee: International Business Machines Corp., Armonk, N.Y.

[21] Appl. No.: 805,263

[22] Filed: Dec. 9, 1991

Related U.S. Application Data

[63] Continuation of Ser. No. 424,456, Oct. 20, 1989, Pat. No. 5,107,496.

[51] Int. Cl.[5] ............................................. G06F 11/00
[52] U.S. Cl. ..................... 371/7; 364/DIG. 1; 364/280.3; 364/281.9; 395/575; 371/11.2
[58] Field of Search .................. 371/8.2, 11.2, 11.3, 371/7; 364/DIG. 1; 395/575

[56] References Cited

U.S. PATENT DOCUMENTS 4,030,073 6/1977 Armstrong, Jr. .................. 364/200
4,545,013 10/1985 Lyon et al. ........................ 395/200

OTHER PUBLICATIONS

Linebarger, R, et al., "Tracking Network Topology with a General-Purpose Database Manager", *Data Communications*, May 1986.

Sutter, M., et al., "Designing Expert Systems for Real-Time Diagnosis of Self-Correcting Networks", *IEEE Network Magazine*, Sep. 1988, pp. 43-51.

Fernandez, J., "SNA and OSI: Which Manages Multi-vendor Networks Best?", *Data Communications*, Apr. 1989.

Primary Examiner—Stephen M. Baker
Attorney, Agent, or Firm—William B. Porter

[57] ABSTRACT

A switching error detection and recovery mechanism recognizes that an I/O configuration has changed. Comparing new configuration data to previous data maintained in a CDT table structure, and detecting unequal path information, an error condition is recognized. After recognizing the error condition, recovery actions are taken to notify the operator and insure data integrity. The CDT is structured so that redundant data is eliminated, and so records may be efficiently and dynamically added and deleted.

7 Claims, 14 Drawing Sheets

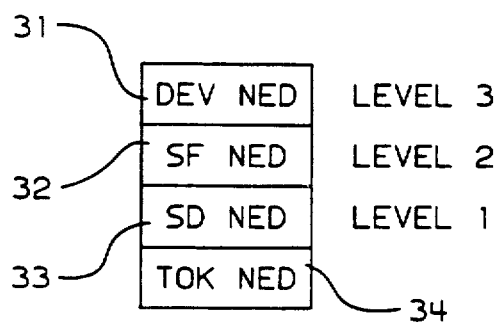
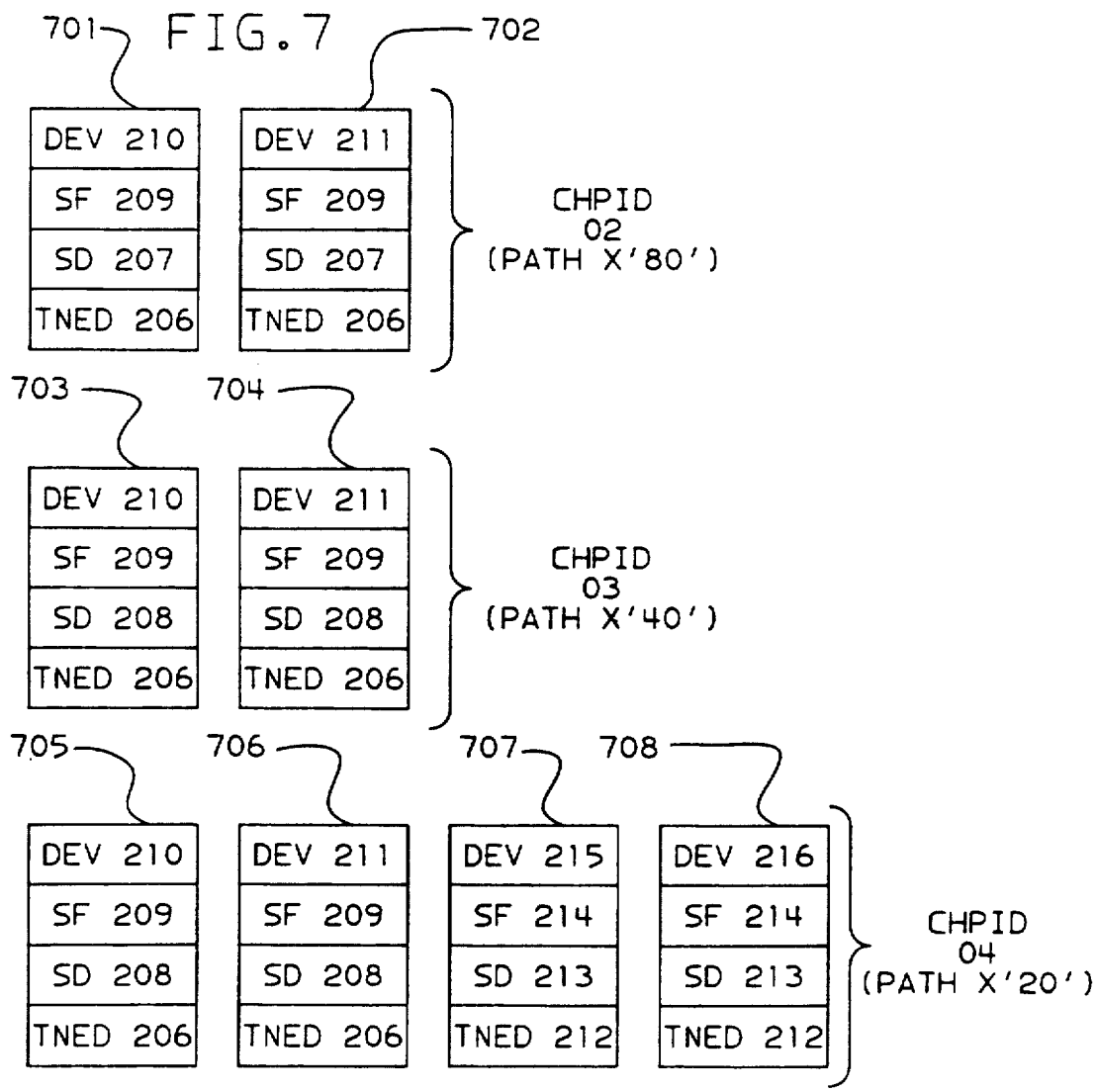

ADDCDR

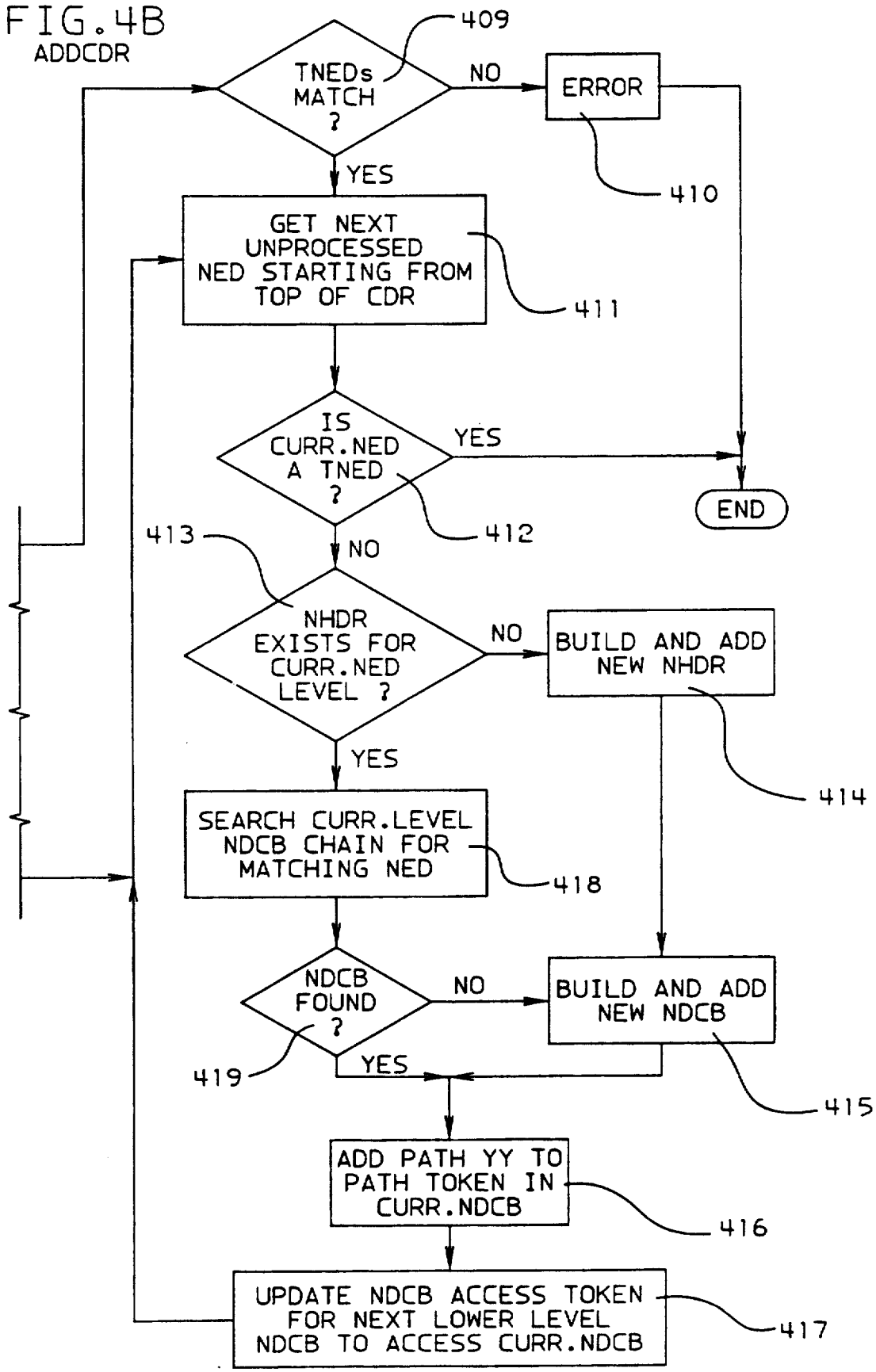

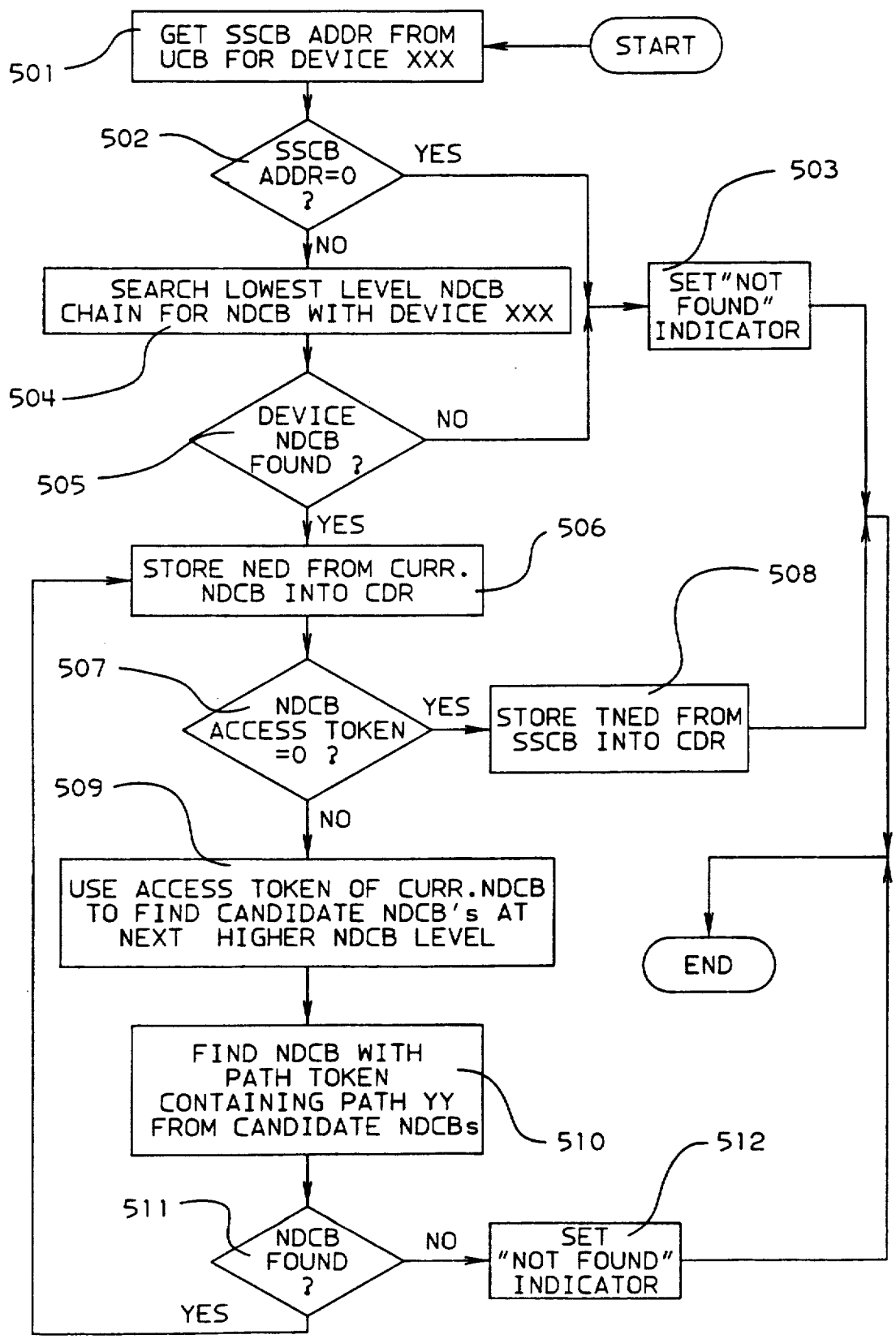

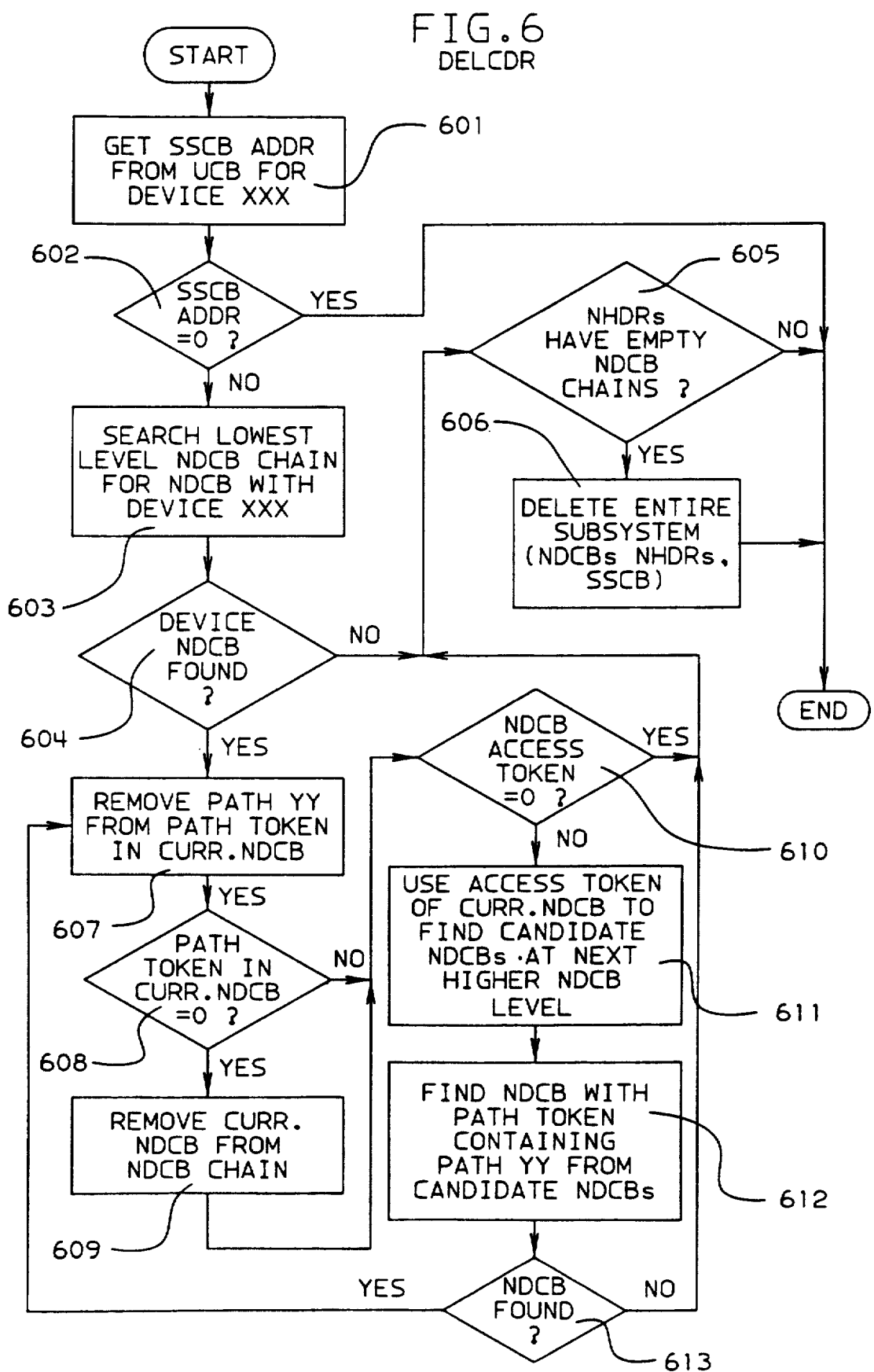

METHOD AND SYSTEM FOR DETECTING AND RECOVERING FROM SWITCHING ERRORS

This is a continuation of copending application Ser. No. 07/424,456 filed on Oct. 20, 1989, now U.S. Pat. No. 5,107,496.

CROSS REFERENCE TO RELATED APPLICATIONS

This application contains subject matter which is related to the subject matter of the following application, filed on Sep. 26, 1988, and assigned to the same assignee: "Device Initiated Partial System Quiescing", by (Beardsley, Hefferon, Lynch, Schimke and Shipman) Ser. No. 251,969, now U.S. Pat. No. 4,970,640. This co-pending application is incorporated by reference herein.

BACKGROUND OF THE INVENTION

1. Field of the Invention

This invention relates to computers and computer system complexes, and operating systems for controlling them. More particularly, this invention describes a system and method for detecting errors in switching actions affecting I/O devices connected to main processors, and recovering from such errors.

2. Background Art

As data processing needs of system users grow, the number of peripheral devices supported by a data processing system also grows. Multiple data processing applications require a plurality of various peripheral devices. The term "device", as used herein, includes such components, whether or not directly addressable, as control units, peripheral cache memories, communications apparatus, data storage units such as direct access storage devices (DASD), tape recorders, and the like. It also includes separately maintainable portions thereof as will become apparent. These devices occasionally need maintenance of a type requiring the device to be temporarily disconnected from the data processing system.

The maintenance/switching of peripheral devices has become more difficult as data processing systems become more complex. Often peripheral devices are in rooms or on floors of a building separated from the connected central processing units and device controllers. The maintenance of a particular peripheral device or of a section of devices under the control of one control unit requires the coordination of the operator at the system console together with the maintenance personnel at the control units and/or devices. When a maintenance action is required on a device, the central processing units (CPUs) must first be informed that the maintenance is to take place. Information about the extent of maintenance must be provided to the central processing unit such that the processors can take the necessary action to quiesce, i.e., cease communication with the use of subchannels and channel paths that relate to the portion of the device that is to be maintained "off-line". This action is necessary to maintain data integrity.

The data integrity exposure arises because communication with a device or device path must be terminated logically before the customer disables channel interfaces, restarts storage paths, re-IMLS control units, or performs any maintenance action that will cause a reset to occur. If this is not done, a device reservation may be lost (the hardware feature that allows multiple systems to serialize the use of data on a device). If this happened, a partially updated record/data set could be accessed by a sharing system thus allowing the data to be corrupted. An integrity exposure could also arise if a system used a certain device number/UCB (Unit Control Block) to refer to two different physical devices at two different times without having the system operator take the paths off-line (conventionally with a VARY command) before switching—causing successive I/O operations to go to different devices.

The IBM Dynamic Pathing feature does not eliminate the integrity exposure due to the system reset. The Dynamic Pathing feature of, for example, the IBM 3880 Control Unit and 3380 devices, and the IBM 3990 Control Unit and 3380 devices (reference: IBM 3990 Storage Control Reference, GA32-0099) allows MVS to establish system related reserves to devices. This means that every on-line path is part of a path group and assumed to contain the reserve whenever the device is reserved. MVS takes advantage of this feature during its channel path recovery actions. When the software must issue a system reset to a channel path, the operator does not have to be told to stop the sharing processors if all the devices on a channel path have dynamic pathing active and an alternative on-line path that contains the reserves. If there are no alternative paths the operator is given the opportunity to stop the sharing systems before the data can be corrupted.

If maintenance is to be performed on a device or control unit, the operator, or CE, must explicitly issue the proper reconfiguration commands to each attached system. This tells the systems that the path is not available for use and that the path does not belong to the path group and does not contain the reserve. If this is not done, the software may issue a system reset to recover a channel and not give the operator the opportunity to stop all the sharing processors. The reserve will then be lost, and the data corrupted.

Several steps must be taken to notify all of the central processing units or host systems of the maintenance action and to determine when the action can be performed. First, a service representative or other maintenance person determines the correlation between the physical portions of the device to be maintained and the device numbers and channel path identifiers that are affected for each attached CPU. Next, the service representative goes from CPU to CPU and enters appropriate reconfiguration commands at each CPU to quiesce the specified channel paths and I/O devices. Once a particular device has been electrically disconnected or logically isolated from the system of CPUs, the service representative then performs the required maintenance. Finally, upon completing the maintenance, the service representative goes from CPU to CPU and enters appropriate reconfiguration commands at each central processing unit to give notification that the just-maintained device is again available.

U.S. Pat. No. 4,195,344 discloses the use of a monitor center that permits the automatic supervision of the configuration of a data processing system. This patent is representative of the relevant art in that if it is necessary to disconnect or reconnect the devices during the operation of a data processing system for the purpose of maintenance, inspection, or repair, it was necessary to inform the operating system of the connection or disconnection by the use of the identification number of the device. The operator communicates with the data processing system to report the disconnection and to order reconfiguration of the devices for enabling the data processing system to continue operation without the devices. This patent disclosed a means for communicating system configuration to an operator to facilitate recognition of configuration errors. However, the criteria for defining an error are not stated, and the recognition is presumably to be done by the operator.

A technique used in some instances (such as the taking of a device off-line for maintenance by an operator, followed by its reintroduction) by which a system could verify that all paths to a device actually accessed the proper device was to reread the volume label on the device. (It would be initially read by MVS when the device was placed on-line, or made logically available for use.) This technique was limited in that it was appropriate for DASD devices only—and was used to insure that the correct DASD volume was still mounted; it therefore fell into disuse with the advent of non-demountable DASD devices such as the IBM 3380. The technique also depended on the installation preventing duplicate DASD labels.

SUMMARY OF THE INVENTION

This invention describes a system for storing device configuration information in an efficient and unique manner, so that later configuration changes can be readily recognized, and errors appropriately handled. It comprises a novel data structure, designed to permit storage and retrieval of path descriptions containing common node elements, without replication of node description information; and a technique for using this information to detect and recover from switching errors.

An object of this invention is to provide a system and method for storing I/O device configuration data with minimum use of storage, and maximum operational efficiency.

A further object of this invention is to readily detect and recover from errors in switching paths to I/O devices connected to computer systems.

Still a further object of this invention is to prevent data integrity problems by recognizing switching errors in the normal course of performing I/O, and taking appropriate recovery actions.

BRIEF DESCRIPTION OF THE DRAWINGS

FIG. 3 is a structure diagram showing the general structure of a Configuration Data Record (CDR).

FIGS. 4a and 4b are a flowchart illustrating ADDCDR processing.

FIG. 5 is a flowchart illustrating GETCDR processing.

FIG. 6 is a flowchart illustrating DELCDR processing.

FIG. 7 is a structure diagram of the CDRs associated with the example layout of FIG. 2.

DESCRIPTION OF THE PREFERRED EMBODIMENT

Figure 2:
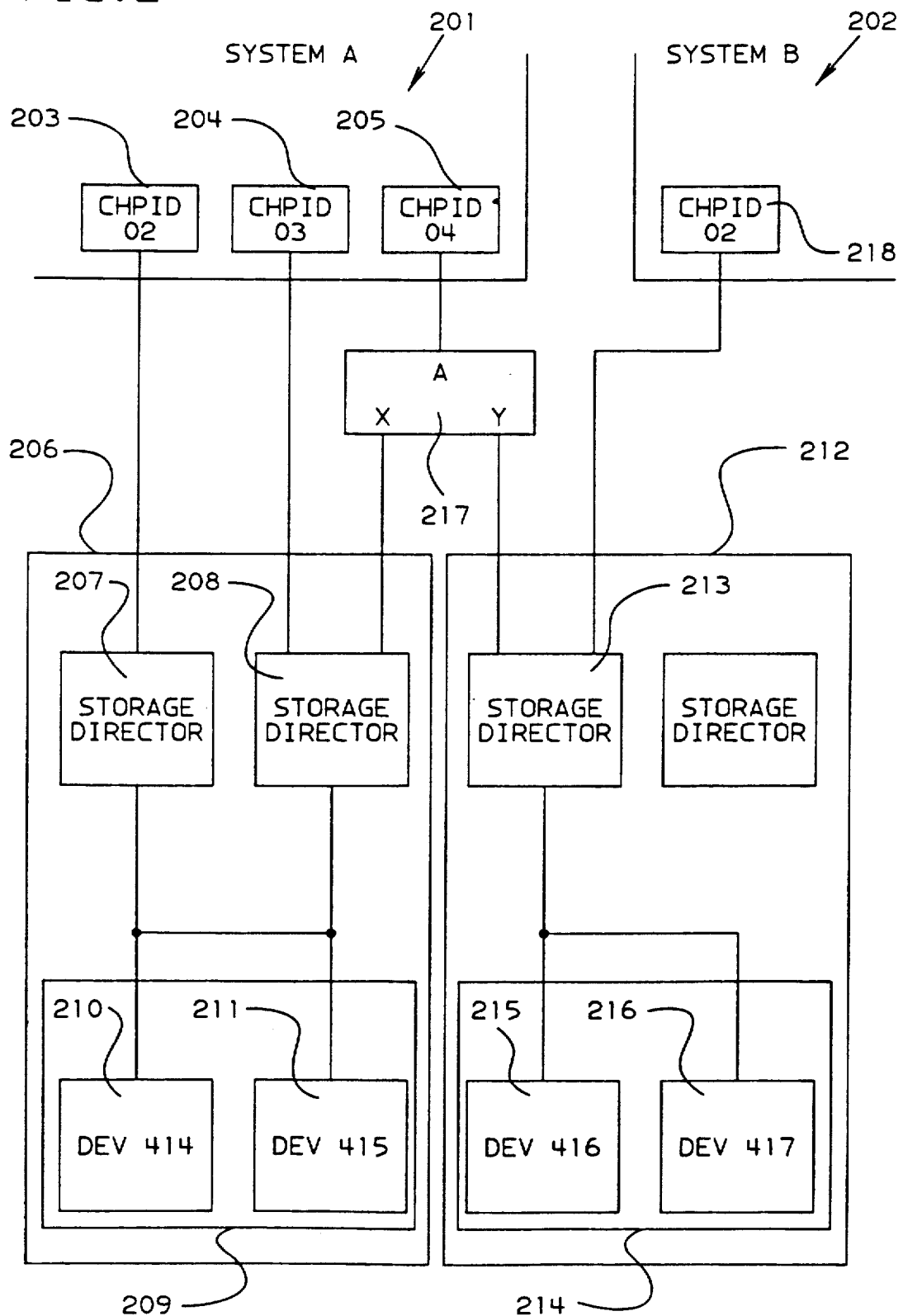
FIG. 2 is a schematic diagram showing a sample device and path layout.

FIG. 2 shows a sample layout of devices and paths associated with two host systems. System A (201) has three channel paths connected to it: 02 (203), 03 (204), and 04 (205). One channel path 203 is connected to one storage director 207. Storage director 207 connects to two devices 414 (210), and 415 (211). Devices 210 and 211 belong to storage facility 209 and to subsystem 206. An I/O subsystem is defined as the set of all devices that have CDRs with at least one matching NED. For example, a 3990 Model 3 EF subsystem consists of a set of I/O devices and all storage directors and storage facilities that share these devices.

Channel path 204 is connected to storage director 208. Storage director 208 also connects to devices 210 and 211 within storage facility 209.

Channel path 205 is connected to storage director 208 through switch 217. (such a switch is the IBM 3814 switch.) Channel path 205 is also connected to storage director 213. Storage director 213 is connected to devices 416 (215) and 417 (216) within storage facility 214. Storage director 213 and devices 215 and 216 all belong to subsystem 212. Switch 217 can move the connection of channel path 205 from storage director 208 within subsystem 206 to storage director 213 within subsystem 212.

A separate system, system B (202), has channel path 218 connected to storage director 213 within subsystem 212.

In accordance with the present invention, a host system (for example MVS/ESA) issues a command to obtain requested configuration data on receipt of an indication (reset notification) that the configuration may have changed. (This reset notification is well known, and described in the IBM 3990 Storage Control Reference Manual (GA32-0099).

U.S. Pat. No. 4,574,346 shows a plurality of channel commands which are incorporated into a single channel command called Read Configuration Data (RCD) as used in the present description. In implementing the present invention, such RCD channel command is expanded to include the later described function. I is also to be understood that the tables of the various host systems 201, 202 used for addressing, as is well known, are not shown in FIG. 2 for purposes of simplicity. Such addressing tables include addresses and access controls associated with channel path grouping as described above. In practicing the present invention in its best mode, each of the host systems 201, 202 include configuration data records (CDR) which are obtained from the I/O devices in subsystems 206, 212 at system initialization. The RCD command is issued on each path to each device in subsystems 206, 212 to obtain all the CDRs. There is one CDR per path to a device.

A CDR includes a variable number of 32-byte fields called node-element descriptors (NEDs) (FIG. 3 at 31, 32, 33). A node-element is any identifiable entity in the device (for example, an I/O device or a control unit). An NED contains information that uniquely describes a node-element (for example, serial number). The last NED in a CDR is a special type of NED, called a token NED (TNED) (FIG. 3 at 34), which is used to identify the CDRs associated with a subsystem. All CDRs in a subsystem have the same TNED.

A table called the configuration data table (CDT) (FIG. 1) is used to store the CDRs read by the RCD command.

Conceptually, the CDT consists of a set of CDRs (FIG. 3 describes the contents of a CDR). Three primitive operations are provided to access the data in the CDT:

ADDCDR—add a CDR for a given device path to the CDT.

GETCDR—retrieve a CDR for a given device path from the CDT.

DELCDR—delete a CDR for a given device path from the CDT.

Figure 1:
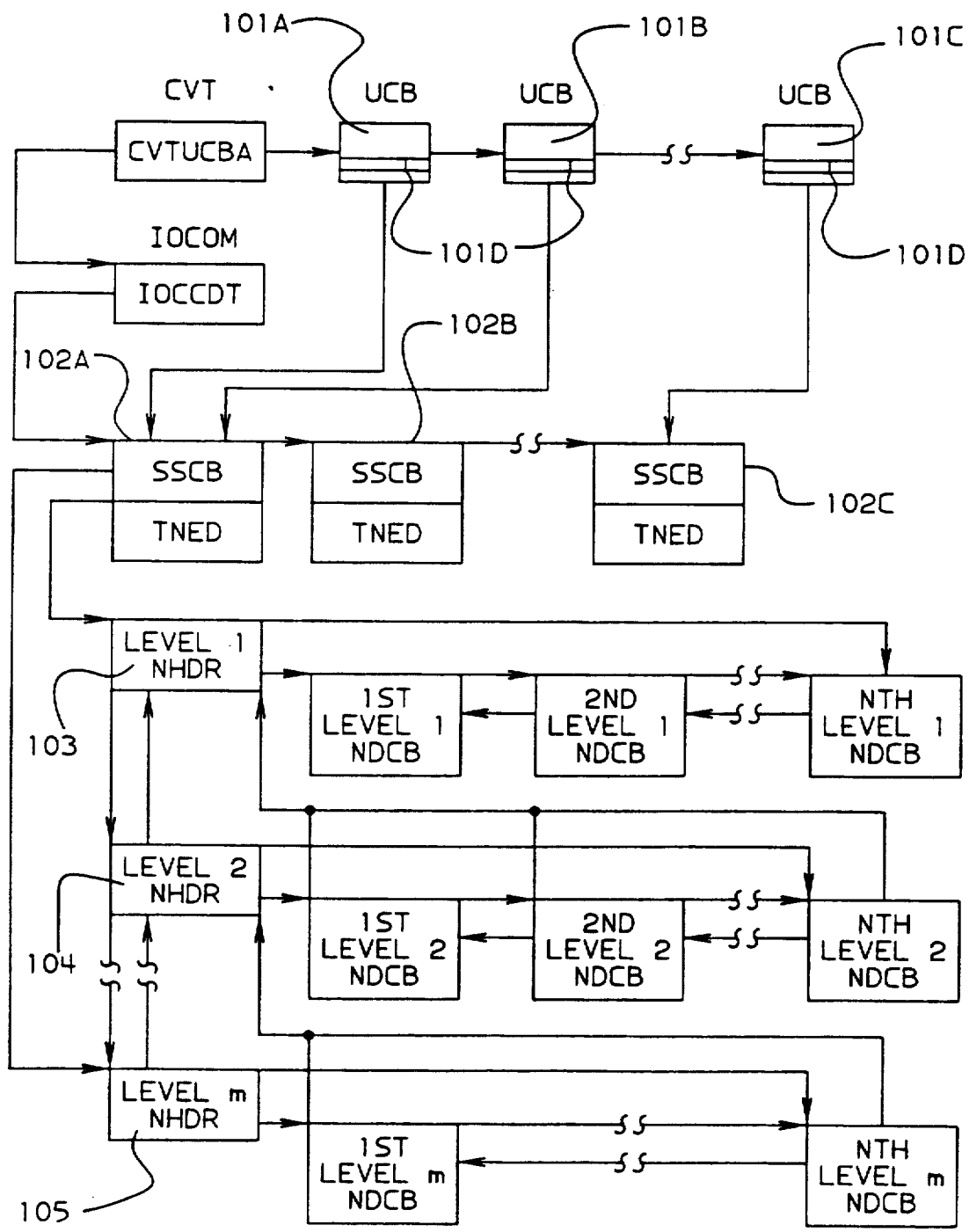
FIG. 1 is a detail structure diagram of a Configuration Data Table (CDT).

In detail, the CDT appears as in FIG. 1. The level n NED of FIG. 3 would be contained in a level n NDCB in FIG. 1. The CDRs in the CDT are grouped by I/O subsystem. Two CDRs are associated with the same subsystem if they contain at least one matching node element—in which case they will have the same token NED. For example, a 3990 DASD subsystem consists of a set of I/O devices, and all storage directors and storage facilities that access these I/O devices. An I/O subsystem is represented in the CDT by a subsystem control block, SSCB, which identifies the subsystem. All CDRs in the subsystem are grouped under the SSCB. Each UCB (101A, 101B, 101C) associated with a device for which a CDR exists contains a pointer to the SSCB (102A, 102B, 102C) associated with the subsystem to which the device belongs.

A CDR is stored in the CDT as follows:

1. The NEDs in a CDR, each of which are stored in an NED control block (NDCB), are stored in a hierarchy, with the first NED (device level NED) in a CDR (FIG. 3 at 31) at the lowest level (level m in FIG. 1), and the last NED (nontoken NED) in a CDR (33) at the highest or top level (level 1 in FIG. 1) in the hierarchy. NDCB header control blocks (NHDRs) (103, 104, 105) point to the NDCB chain in each level.

Figure 8:
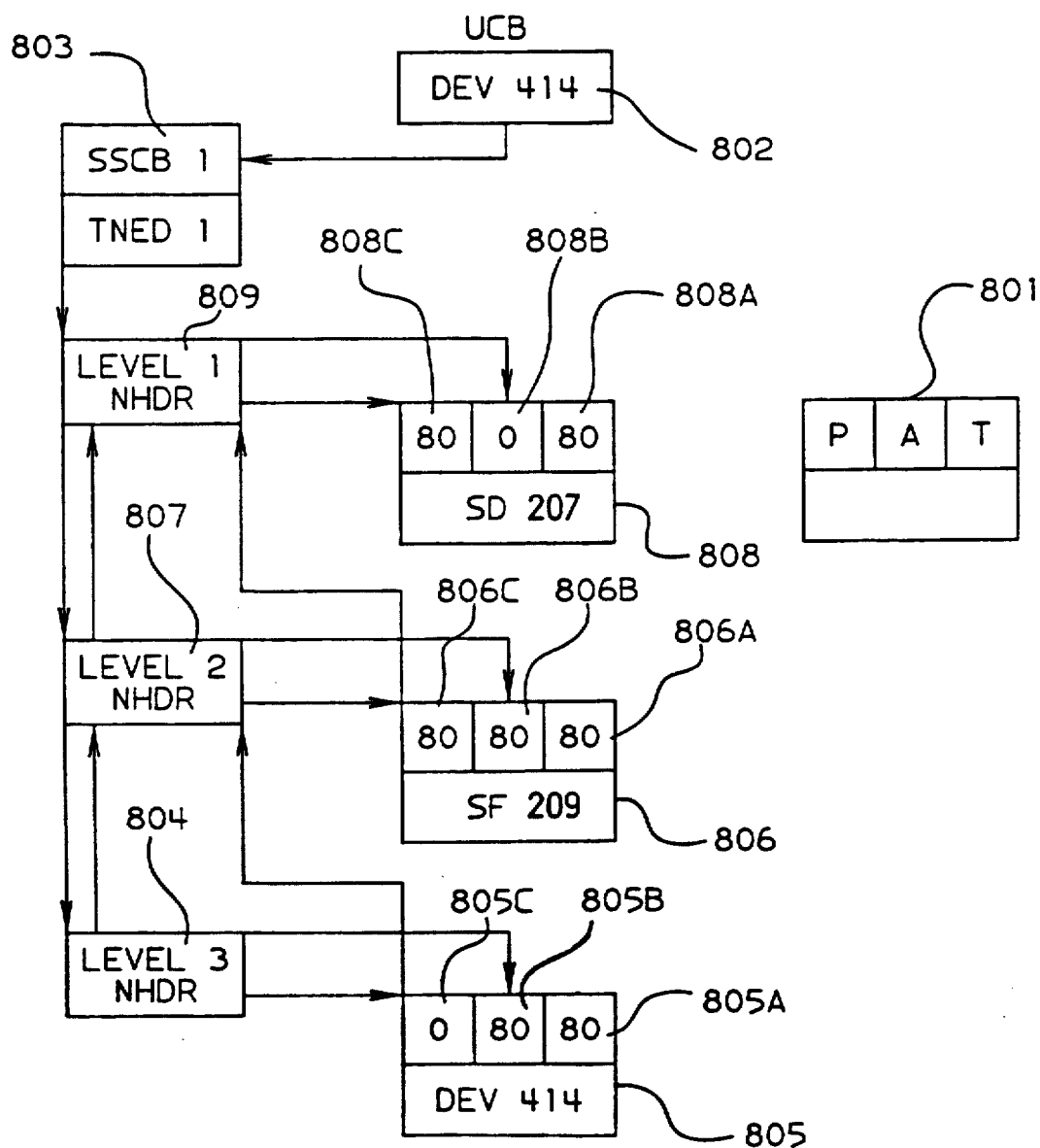
FIG. 8 is a structure diagram showing the CDT after adding the CDR for a particular device path (device 414, path, X '80').

In order to maintain the relationship between NDCBs which form a CDR, each NDCB contains 3 tokens: a position (P) token, an access (A) token, and a path (T) token. These tokens are illustrated in FIG. 8 at 801. The P token defines the position of the NDCB in the level in which it resides. The A token defines an NDCBs relationship with the NDCBs in the next higher level. The T token indicates the path mask of the path on which the NED was read. These tokens are used in the traversal algorithm to get from level to level in the CDT, when adding, deleting, or retrieving CDRs. These tokens allow an any-to-any relationship between NDCBs in adjacent levels.

2. A special type of NED in a CDR, a token NED (TNED) (34), is stored in the SSCB (102A, 102B, 102C), for the subsystem. Each CDR has one token NED. All CDRs in a subsystem have the same token NED.

The following primitive operations performed on the CDT will be discussed: ADDCDR, GETCDR, DELCDR.

ADDCDR

Figure 4A:
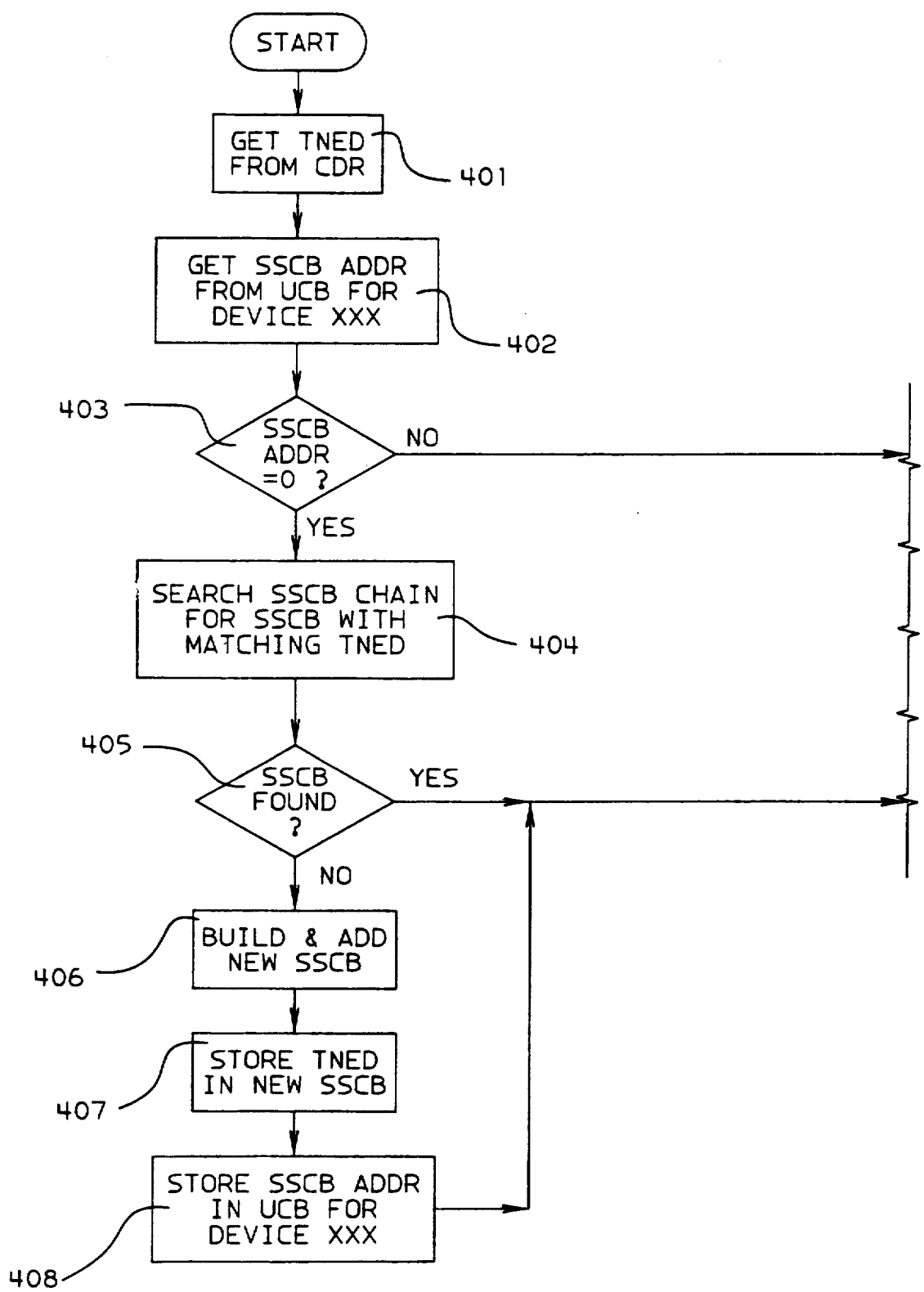

FIG. 4 illustrates the control flow for ADDCDR. At 401, a token NED (see FIG. 3) is obtained from the CDR. Next, 402, the SSCB address is obtained from the UCB associated with device XXX. (FIG. 1 at 101A, 101B, 101C) At 403, a test is made whether the SSCB address is equal to 0, the "null pointer" indication. This address will equal 0 if no CDRs have yet been read for this device. If this is the case, a search is made at 404 of the SSCB chain for an SSCB with a token NED matching that in the CDR. At 405, if this search results in an SSCB being found, this implies that a CDR was read from another device in the same subsystem, and processing continues at 411. If an SSCB is not found, then, 406, a new SSCB is built and added to the chain. Then, 407, the token NED is stored in the new SSCB, and the address of the newly created SSCB is stored in the UCB for device XXX, 408. If the test at 403 indicated that the SSCB address was nonzero, this implies that a CDR for this device has previously been read. In this case, a test is made 409 to see whether the token NED for this CDR equals the token NED within the SSCB. If not, an error must have occurred, since the token NED identifies a particular subsystem, and an inequality of token NEDs would indicate that the same device is simultaneously in two different subsystems. This could occur because of the very switching error that is the focus of this invention. In this case, 410, an error indication is set indicating the token NEDs do not match, and the ADDCDR routine is exited. If the test at 409 indicated that the token NEDs do match, the next unprocessed NED (which then becomes the current NED) from the top of the CDR is obtained 411. FIG. 3 illustrates that the CDR is a sequence of NEDs ending with the token NED. A test is made at 412 whether this current NED is a token NED. If so, as illustrated in FIG. 3, the end of the CDR has been reached and the ADDCDR routine is exited. If it is not a token NED, then a test is made at 413 whether an NED header exists for the current NED level. If such an NED header does not exist, this indicates that this CDR must be the first CDR read in this subsystem, and a new NED header is built 414. Next, 415, a new NDCB is built to contain the current NED and is chained off the NED header as indicated in FIG. 1 (103, 104, 105). Next, 416, path YY is added to the path token in the current NDCB. Finally, at 417, the lower level NDCB is linked to the current NDCB for this CDR by updating the NDCB access token for the next lower level NDCB to access the current NDCB. Then, once again, the next unprocessed NED is obtained 411, and processing continues as described. If the test at 413 indicated that the NED header does exist for the current NED level, then the current level NDCB chain is searched for a matching NED 418. A test is then made whether this search resulted in an NDCB being found 419. If it was not found, a new NDCB is built and added as previously indicated, 415. If an NDCB is found, processing continues at 416 as previously indicated.

GETCDR

FIG. 5 illustrates the control flow for GETCDR. At 501, the SSCB address is obtained from the UCB associated with device XXX. (FIG. 1 at 101A, 101B, 101C) At 502, a test is made whether the SSCB address is equal to zero. This address will equal zero if no CDRs have yet been read for this device. If this is the case, a "not found" indication is set at 503, and exit is made from GET CDR. If the test at 502 indicated that the SSCB address was nonzero, this implies that a CDR for this device has previously been read. The lowest level in the NDCB chain is then searched at 504 for an NDCB with device number XXX. If such an NDCB is not found, 505, a "not found" indication is set, 503, and the routine is exited. If an NDCB associated with device XXX was found, the NED from this NDCB is stored into the CDR being built 506. A test is then made at 507 whether the access token within the current NDCB is equal to zero. If it is equal to zero, this indicates that the NDCB is at the highest level, and then the token NED from the SSCB is stored into the CDR which is being built, 508, and the routine is exited. If the access token was not equal to zero, this indicates that there are higher level NDCBs to be searched for this CDR. The access token of the current NDCB is then used to find candidate NDCBs at the next higher NDCB level 509. (The procedure for accomplishing this is illustrated in the GETCDR example below.) Within these candidate NDCBs, that NDCB having a path token containing path YY is selected, 510. If such an NDCB is not found, a "not found" indication is set, 512, and the routine is exited. This would normally be the case only in an error situation (e.g.—truncated queues because of a storage error). If the NDCB containing path YY has been found, the NED from this NDCB is stored into the CDR being built, 506, and processing continues as indicated.

DELCDR

FIG. 6 illustrates the control flow for DELCDR. At 601, the SSCB address is obtained from the UCB associated with device XXX. (FIG. 1 at 101A, 101B, 101C) At 602, a test is made whether the SSCB address is equal to zero. If it does equal zero, there are no CDRs in the CDT associated with this device, so the routine is simply exited. If the SSCB is not equal to zero, the lowest level NDCB chain is searched for the NDCB having device number XXX, 603. If an NDCB having this device number was not found, 604, the data structure contains an error (e.g., a queue storage error may have occurred). If any NHDR chains are empty (605), all should be empty (any device in the subsystem would have an entry at each level), so all control blocks for the subsystem are deleted 606, and the routine is exited. (if the chains are not empty, valid data may exist for other devices in the subsystem so the routine is exited with no block deletion). If an NDCB having this device number was found, then path YY is removed from the path token in the current NDCB 607. A test is then made, 608, whether the path token in the current NDCB is equal to zero. A value of zero indicates that every CDR for this device has been deleted. In this case, 609, the current NDCB is removed from the NDCB chain. Next, 610, a test is made whether the NDCB access token is equal to zero. If so, this indicates that the top level in the CDT has been reached. The CDR at this point has been effectively deleted from the CDT. A test is then made, 605, whether any NDCB header has an empty NDCB chain. If so, all NDCB chains should be empty, and the entire subsystem is deleted from the CDT by deleting associated NDCBs, NED headers, and SSCBs, 606. The routine is then exited. If the test at 610 indicated that the NDCB access token was nonzero, then the access token of the current NDCB is used to find candidate NDCBs at the next highest NDCB level, 611. Among these candidate NDCBs, that NDCB having a path token containing path YY is selected 612. Having found such an NDCB, 613, path YY is removed from the path token in this current NDCB, 607, and processing continues. If such an NDCB was not found at 613, processing continues at 605—although this situation would not normally occur unless there has been some sort of error.

FIG. 7 shows 8 CDRs. CDRs 701 and 702 are the CDRs associated with device 414 (210) and device 415 (211) respectively, which were read using channel path ID 2 (203). Each includes an NED for its respective device (414 or 415), for the storage facility (209) to which both devices belong, and for storage director 207. They also include a token NED associated with the subsystem to which the devices belong. The path along which these devices was reached is the first such path, and so is designated as path X '80'. A path token containing this path identifier will be used when the CDRs are stored in the CDT (see FIG. 8 at 801). CDRs 703 and 704 are the CDRs obtained when issuing an RCD command on channel path ID 03 (204). As with the previous CDRs, they contain device NEDs, storage facility NEDs, storage director NEDs (however these will indicate storage director 208), and token NEDs associated with subsystem 206. This path being the second path on which the devices may be reached, it has a path mask of X '40'. The last four CDRs, 705, 706, 707, 708, are the CDRs obtained when an RCD command is issued for any of the four devices on channel path ID 04 (205). CDRs 705 and 706 are identical to CDRs 703 and 704, since the same nodes are traversed in reaching these devices. (No node ID is associated with switch 217.) These two CDRs will however have a path identifier of X 20, since they are reached using the third channel path identifier (CHPID 04 (205)). CDRs 707 and 708 have device NEDs identifying devices 416 (215) and 417 (216) respectively. They also contain NEDs associated with storage facility 214, NEDs associated with storage director 213, and token NEDs associated with subsystem 212. As with CDRs 705 and 706, CDRs 707 and 708 will be stored in the CDT with path tokens of X 20. These eight CDRs are used to illustrate the operations which are described as follows:

ADDCDR

To add the CDR for device 414 (210) on path X '80' (701) to a CDT, the following ADDCDR algorithm is used: (FIG. 8 illustrates the CDT at the completion of this operation)

1. FIND SSCB WITH TNED FOR DEVICE 414

Obtain SSCB address in UCB 414 for device 414 (210). If the address was zero, start at the SSCB chain and locate SSCB with TNED 1. (If address was nonzero, no need to find).

If SSCB not found, build new SSCB with TNED 1 and store the SSCB address in device 414's UCB (802). In FIG. 8 a new SSCB (803) with TNED 1 was built.

2. ADD LEVEL 3 NDCB FOR DEVICE 414 NED TO CDT

If the level 3 NHDR does not exist, build new level 3 NHDR.

Search the level 3 NDCBs for an NDCB containing the device 414 NED.

If level 3 NDCB not found, build a new level 3 NDCB containing the device 414 NED.

Note that each NDCB 801 contains a Position token P, an Access token A and a Path token T. Add the path token X '80' (the path from which CDR 1 was read) to the path token for the device 414 NDCB 805A by logically ORing any previous path token from the device 414 NDCB to the token X '80'.

Add the device 414 NDCB 805 to the level 3 NDCB chain.

In FIG. 8, a new level 3 NHDR 804 and NDCB 805 were built.

3. ADD LEVEL 2 NDCB FOR SF 209 NED TO CDT

If the level 2 NHDR does not exist, build new level 2 NHDR.

Search the level 2 NDCBs for an NDCB containing the SF 209 NED.

If level 2 NDCB not found, build a new level 2 NDCB containing the SF 209 NED.

Add the path token X '80' (the path from which CDR 1 was read) to any previous path token 806A for the SF 209 NDCB by logically ORing the path token from the SF 209 NDCB to the token X '80'.

Set the position token 806C for the SF 209 NDCB. In the diagram, the SF 209 NDCB is in the first position (X '80').

Add the SF 209 NDCB 806 to the level 2 NDCB chain.

Update the access mask 805B for the device 414 NDCB 805 to access the SF 209 NDCB 806.

Add the position token for the SF 209 NDCB to the access token 805B for the device 414 NDCB 805 by logically ORing the position token from the SF 209 NDCB 806C to the access token from the device 414 NDCB 805B.

In FIG. 8, a new level 2 NHDR 807 and NDCB 806 were built.

4. ADD LEVEL 1 NDCB FOR SD 207 NED TO CDT

If the level 1 NHDR does not exist, build new level 1 NHDR.

Search the level 1 NDCBs for an NDCB containing the SD 207 NED 1004.

If level 1 NDCB not found, build a new level 1 NDCB containing the SD 207 NED.

Add the token X '80' (the path from which CDR 1 was read) to the path token for the SD 207 NDCB by logically ORing the path token from the SD 207 NDCB to the token X '80'.

Set the position token for the SD 207 NDCB. In the diagram, the SD 207 NDCB is in the first position (X '80').

Add the SD 207 NDCB 808 to the level 1 NDCB chain.

Update the access mask 806B for the SF 209 NDCB 806 to access the SD 207 NDCB 808.

Add the position token for the SD 207 NDCB to the access token for the SF 209 NDCB by logically ORing the position token from the SD 207 NDCB 808C to the access token 806B from the SF 209 NDCB.

In FIG. 8, a new level 1 NHDR 809 and NDCB 808 were built.

Figure 9:
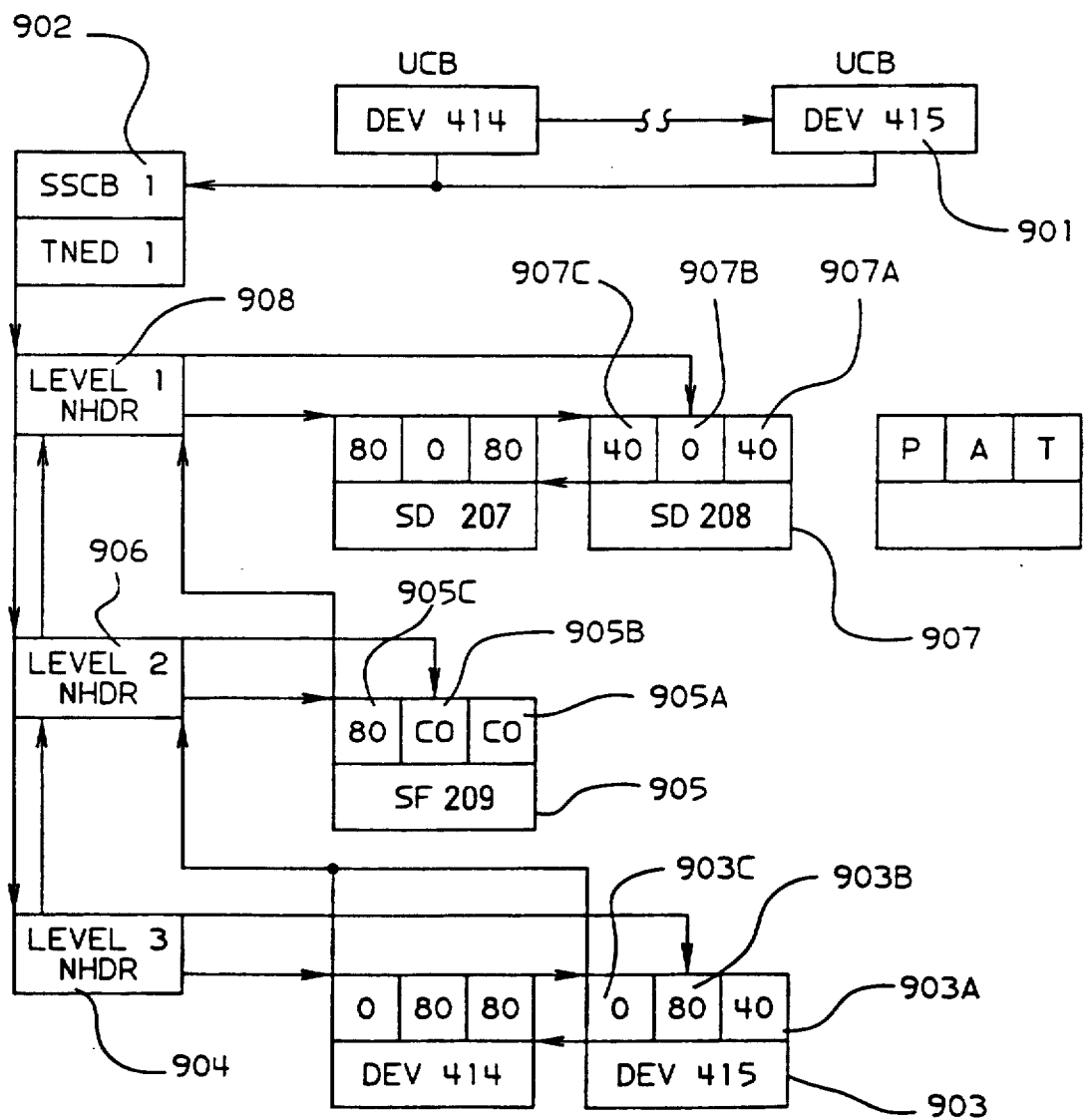
FIG. 9 is a structure diagram showing the CDT after adding the CDRs for two additional device paths.

To add the CDR for device 415 on path X '40' to the CDT represented by FIG. 8, the previously explained ADDCDR algorithm is used: (FIG. 9 shows the CDT after completing this operation.)

1. FIND SSCB WITH TNED FOR DEVICE 415

Obtain SSCB address in UCB 415 for device 415 (211). If the address was zero, start at the SSCB chain and locate SSCB with TNED 1. (If address was non-zero, no need to find). If SSCB not found, build new TNED 1 and store the SSCB address in device 415's UCB (901). In FIG. 9, SSCB 1 902 contains TNED 1.

2. ADD LEVEL 3 NDCB FOR DEVICE 415 NED TO CDT

If the level 3 NHDR does not exist, build new level 3 NHDR.

Search the level 3 NDCBs for an NDCB containing the device 415 NED.

If level 3 NDCB not found, build a new level 3 NDCB containing the device 415 NED.

Add the token X '40' (the path from which CDR 4 was read) to the path token for the device 415 NDCB by logically ORing the path token 903A from the device 415 NDCB to the token X '40'.

Add the device 415 NDCB to the level 3 NDCB chain.

In FIG. 9, the level 3 NHDR 904 already existed, but a level 3 NDCB containing the device 415 NED was not found so a new level 3 NDCB 903 was built.

3. ADD LEVEL 2 NDCB FOR SF 209 NED TO CDT

If the level 2 NHDR does not exist, build new level 2 NHDR.

Search the level 2 NDCBs for an NDCB containing the SF 209 NED.

If level 2 NDCB not found, build a new level 2 NDCB containing the SF 209 NED.

In FIG. 9, the SF 209 NDCB 905 contains the SF 209 NED.

Add the token X '40' (the path from which CDR 4 was read) to the path token for the SF 209 NDCB by logically ORing the path token 905A from the SF 209 NDCB 905 to the token X '40'.

Set the position token 905C for the SF 209 NDCB. In the diagram, the SF 209 NDCB 905 is in the first position (X '80').

Add the SF 209 NDCB 905 to the level 2 NDCB chain.

Update the access mask 903B for the device 415 NDCB to access the SF 209 NDCB 905.

Add the position token for the SF 209 NDCB to the access token for the device 415 NDCB by logically ORing the position token 905C from the SF 209 NDCB 905 to the access token 903B from the device 415 NDCB.

In FIG. 9, the level 2 NHDR 906 already existed, and a level 2 NDCB 905 containing the SF 209 NED was found so the SF 209 NDCB was updated.

4. ADD LEVEL 1 NDCB FOR SD 208 NED TO CDT

If the level 1 NHDR does not exist, build new level 1 NHDR.

Search the level 1 NDCBs for an NDCB containing the SD 208 NED.

If level 1 NDCB not found, build a new level 1 NDCB containing the SD 208 NED.

Add the token X '40' (the path from which CDR 4 was read) to the path token for the SD 208 NDCB 907 by logically ORing the path token 907A from the SD 208 NDCB to the token X '40'.

Set the position token 907C for the SD 208 NDCB. In the diagram, the SD 208 NDCB is in the first position (X '40').

Add the SD 208 NDCB 907 to the level 1 NDCB chain.

Update the access mask 905B for the SF 209 NDCB to access the SD 208 NDCB 907.

Add the position token for the SD 208 NDCB 907 to the access token for the SF 209 NDCB 905 by logically ORing the position token 907C from the SD 208 NDCB to the access token 905B from the SF 209 NDCB.

In FIG. 9, the level 1 DR 908 already existed, but a level 1 NDCB containing the SD 208 NED was not found so a new level 1 NDCB 907 was built.

Figure 10A:
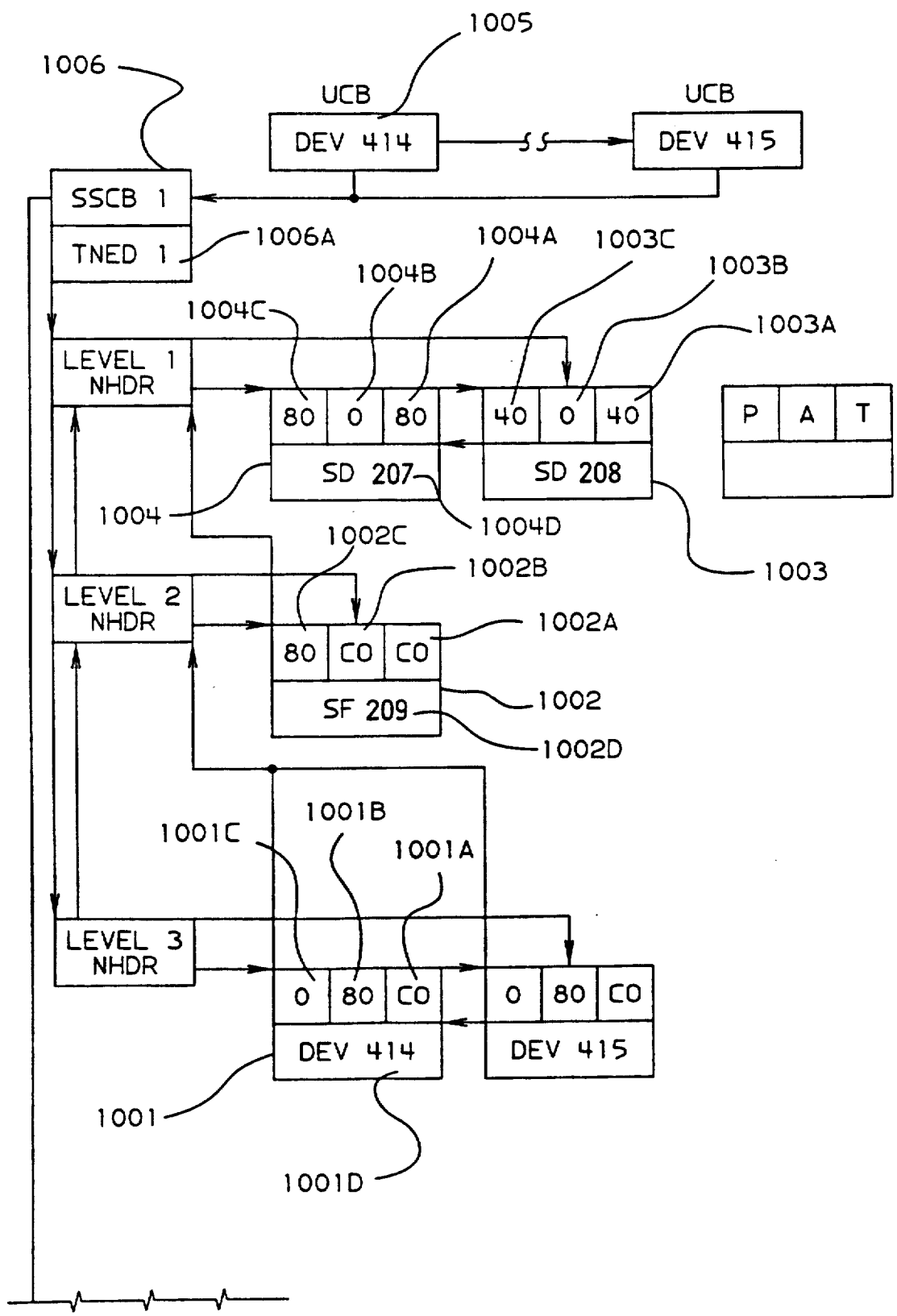
FIGS. 10a and 10b are a structure diagram showing the CDT after adding all CDRs from FIG. 7.
Figure 10B:
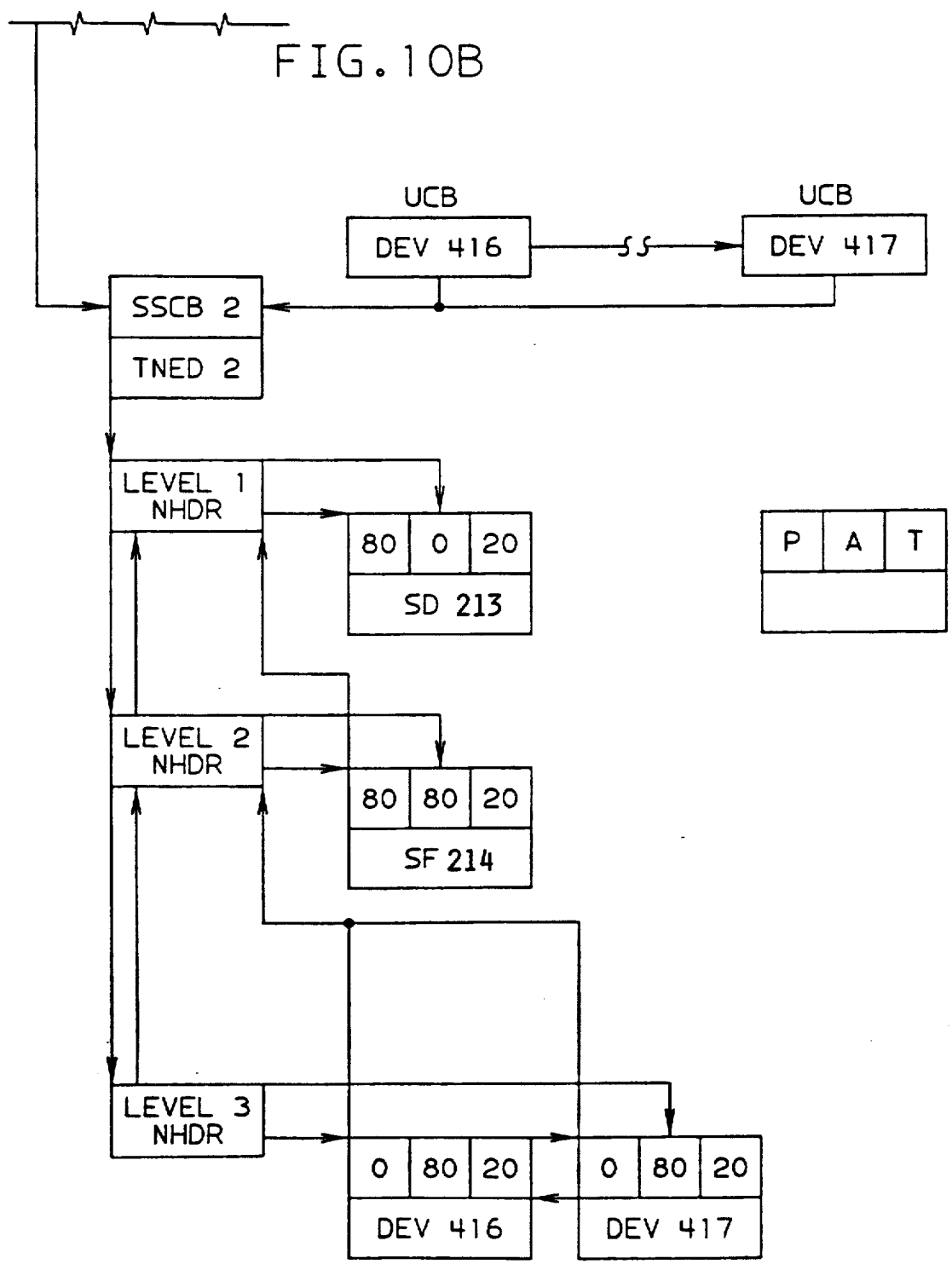

After adding all 8 CDRs from FIG. 7 to the CDT using the previously explained ADDCDR algorithm, the resulting CDT is shown in FIG. 10.

GETCDR

To retrieve the CDR for device 414 on path X '80' (FIG. 7 at 701), the GETCDR algorithm is used as follows:

1. Find the SSCB 1006 for device 414 (the SSCB address is in the UCB 1005)

2. GET LEVEL 3 NDCB

Start at the level 3 NDCBs. Locate the NDCB 1001 which contains the NED for device 414.

3. GET LEVEL 2 NDCB

Logically AND the access token 1001B from the device 414 NDCB 1001 to the position token 1002C from the first level 2 NDCB 1002. If the result is nonzero (as it is), the level 2 NDCB is a candidate NDCB. Now, logically AND the access token 1001B from the device 414 NDCB to the position token from the next level 2 NDCB (in the diagram there is none). If the result is nonzero, the level 2 NDCB is added to the set of candidate NDCBs. Continue this procedure until all level 2 NDCBs have been processed. In FIG. 10, the set of candidate NDCBs contains SF 209 only.

Logically AND the token X '80' (the path from which CDR 1 (701) was read) to each path token from the set of candidate NDCBs, to obtain the correct NDCB from level 2. The candidate NDCB that contains a path token which when logically ANDed to the token X '80' yields a nonzero result, is the correct NDCB from level 2. In FIG. 10, this is the NDCB 1002 for SF 209.

4. GET LEVEL 1 NDCB

Logically AND the access token 1002B from the SF 209 NDCB to the position token 1004C from the first level 1 NDCB. If the result is nonzero (it is), the level 1 NDCB is a candidate NDCB. Now, logically AND the access token 1002B from the SF 209 NDCB to the position token 1003C from the next level NDCB. If the result is nonzero (it is), the level 1 NDCB is added to the set of candidate NDCBs. Continue this procedure until all level 1 NDCBs have been processed. In FIG. 10, the set of candidate NDCBs contains SD 207 and SD 208.

Logically, AND the token X '80' (the path from which CDR 701 was read) to each path token from the set of candidate NDCBs, to obtain the correct NDCB from level 1. The candidate NDCB that contains a path token which when logically ANDed to the token X '80' yields a nonzero result, is the correct NDCB from level 1. In FIG. 10, this is the NDCB 1004 for SD 207.

5. GET TNED

Retrieve the TNED from the SSCB for device 414. In the diagram, this is TNED 1 (1006A).

Thus, the GETCDR operation yields a CDR consisting of the following NEDs:
Device 414 NED (1001D)
SF 209 NED (1002D)
SD 207 NED (1004D)
TNED 1 NED (1006A)

DELCDR

Figure 11A:
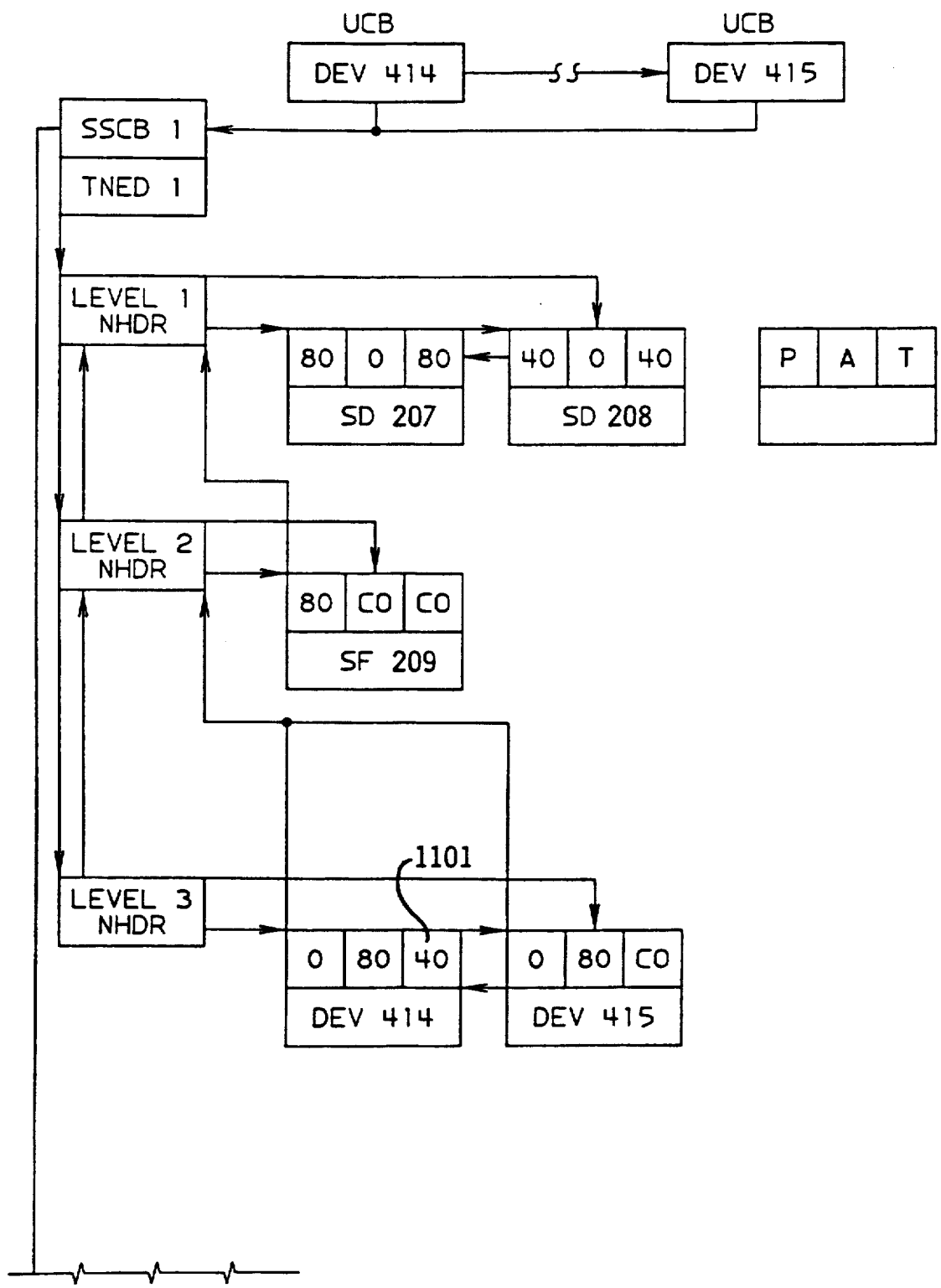
FIGS. 11a and 11b are a structure diagram showing the CDT after deleting the CDR for a particular device path (device 414, path X '80').
Figure 11B:
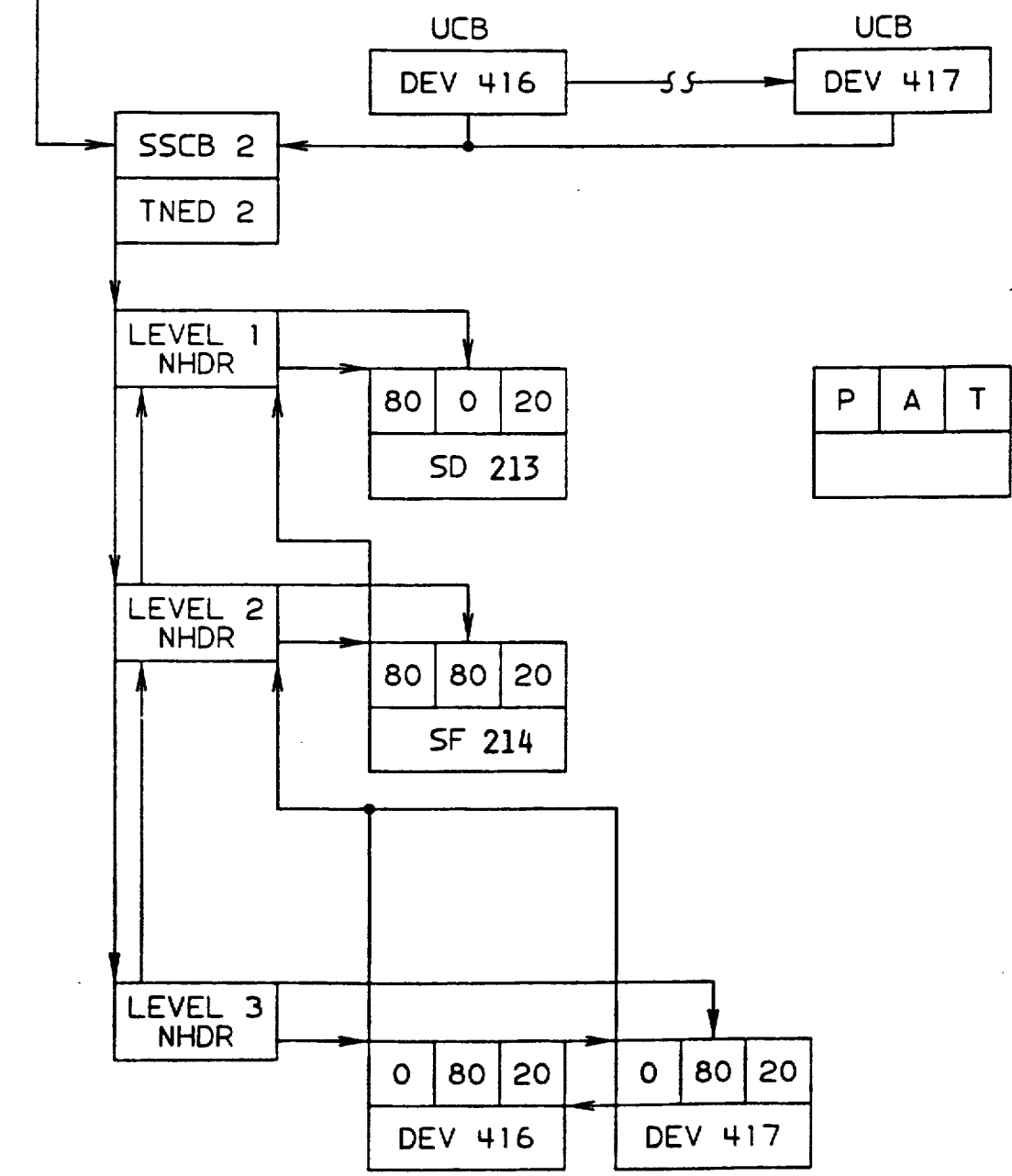

To delete the CDR for device 414 on path X '80' (FIG. 7 at 701) from the CDT represented by FIG. 10, the following DELCDR algorithm is used: (FIG. 11 illustrates the CDT after completing this operation)

1. FIND SSCB 1006 FOR DEVICE 414 (ADDRESS IN UCB 1005).

2. FIND LEVEL 3 NDCB FOR DEVICE 414 ON PATH X '80'

Start at the level 3 NDCBs. Locate the NDCB 1001 which contains the NED for device 414.

3. DELETE LEVEL 3 NDCB FOR DEVICE 414 ON PATH X '80' IF NECESSARY

Exclusive-OR the path token 1001A in the device 414 NDCB with X '80' (the path of the CDR 701 to be deleted). If the result is zero, then delete the NDCB from the level 3 NDCB chain. In FIG. 10, the result is X '40', so the device 414 NDCB 1001 is not deleted.

4. FIND LEVEL 2 NDCB FOR DEVICE 414 ON PATH X '80'

Logically AND the access token 1001B from the device 414 NDCB to the position token 1002C from the first level 2 NDCB. If the result is nonzero (it is), the level 2 NDCB is a candidate NDCB. Now, logically AND the access token 1001B from the device 414 NDCB to the position token from the next level 2 NDCB (in the diagram there is none). If the result is nonzero, the level 2 NDCB is added to the set of candidate NDCBs. Continue this procedure until all level 2 NDCBs have been processed. In FIG. 10, the set of candidate NDCBs contains the NDCB 1002 for SF 209 only.

Logically AND the token X '80' (the path of the CDR 701 to be deleted) to each path token from the set of candidate NDCBs, to obtain the correct NDCB from level 2. The candidate NDCB that contains a path token which when logically ANDed to the token X '80' yields a nonzero result, is the correct NDCB from level 2. In FIG. 10, this is the NDCB 1002 for SF 209.

5. DELETE LEVEL 2 NDCB FOR DEVICE 414 ON PATH X '80' IF NECESSARY

Logically AND the position token 1002C from the SF 209 NDCB to the access token 1001B of the first level 3 NDCB and then logically AND the path mask 1001A of the first level 3 NDCB to the token X '80'. If both logical AND operations produce a nonzero result, then the path token 1002A of the SF 209 NDCB should remain unchanged. If either of the logical AND operations produces a zero result, Exclusive-OR the path token 1002A in the SF 209 NDCB with X '80' (the path of the CDR 701 to be deleted) and delete the NDCB 1002 from the level 2 NDCB chain if the result is zero. Continue this procedure until the path token of the SF 209 NDCB changes or until all level 3 NDCBs have been checked against the SF 209 NDCB. In FIG. 10, the SF 209 NDCB remains unchanged.

6. FIND LEVEL 1 NDCB FOR DEVICE 414 ON PATH X '80'

Logically AND the access token 1002B from the SF 209 NDCB to the position token 1004C from the first level 1 NDCB. If the result is nonzero, the level 1 NDCB is a candidate NDCB. Now, logically AND the access token 1002B from the SF 209 NDCB 1002 to the position token from the next level 1 NDCB 1003C. If the result is nonzero, the level 1 NDCB is added to the set of candidate NDCBs. Continue this procedure until all level 1 NDCBs have been processed. In FIG. 10, the set of candidate NDCBs 1004, 1003 contains SD 207 and SD 208.

Logically AND the token X '80' (the path of the CDR to be deleted) to each path token from the set of candidate NDCBs, to obtain the correct NDCB from level 1. The candidate NDCB that contains a path token which when logically ANDed to the token X '80' yields a nonzero result, is the correct NDCB from level 1. In FIG. 10, this is the NDCB 1004 for SD 207.

7. DELETE LEVEL 1 NDCB FOR DEVICE 414 ON PATH X '80' IF NECESSARY

Logically AND the position token 1004C from the SD 207 NDCB to the access token 1002B of the first level 2 NDCB and then logically AND the path mask 1002A of the first level 2 NDCB to the token X '80'. If both logical AND operations produce a nonzero result, then the path token 1004A of the SD 207 NDCB should remain unchanged. If either of the logical AND operations produces a zero result, Exclusive-OR the path token 1004A in the SD 207 NDCB with X '80' (the path of the CDR to be deleted) and delete the NDCB from the level 1 NDCB chain if the result is zero. Continue this procedure until the path token 1004A of the SD 207 NDCB changes or until all level 2 NDCBs have been checked against the SD 207 NDCB. In FIG. 10, the SD 207 NDCB remains unchanged.

8. DELETE SSCB FOR DEVICE 414 ON PATH X '80' IF NECESSARY

If no more NDCBs remain on any of the levels of NDCBs, delete all levels of NDCBs, the NHDRs, and the SSCB. In the diagram, the SSCB and NHDRs remain unchanged.

Thus, the DELCDR operation yields the CDT as shown in FIG. 11. Note that the only change, as compared with FIG. 10, lies in the path token 1101 for device 414.

RECOVERY EXAMPLE

Figure 12:
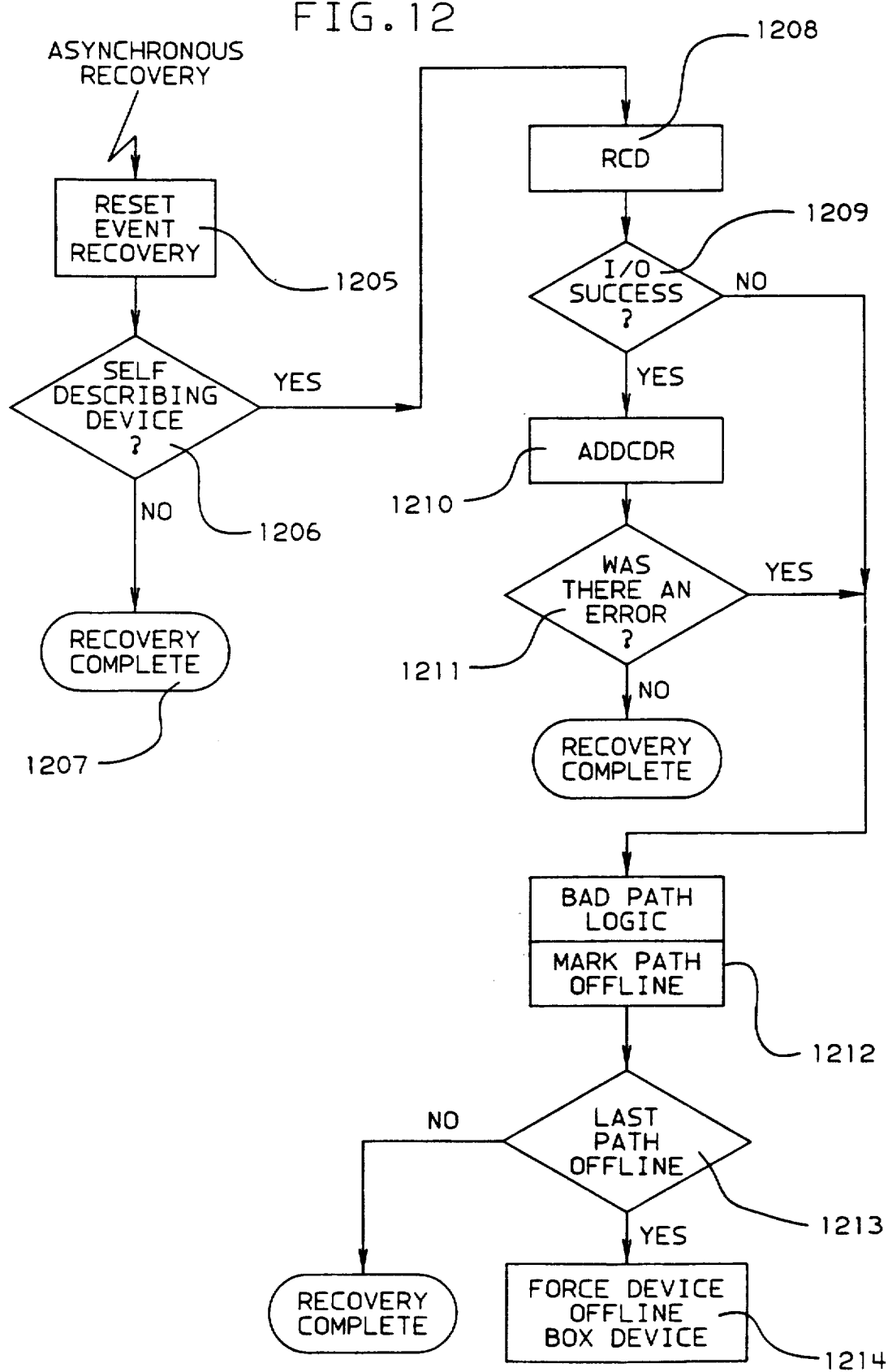
FIG. 12 is a flowchart illustrating control flow during recovery processing.

FIG. 12 illustrates control flow when the configuration data table of this invention is used in device recovery. The configuration of FIG. 2 is assumed to be present in the example system.

System initialization conventionally causes all devices to be signalled a system reset. The system control program issues an I/O operation to each device that connects to the CHPID that reported the reset event. This I/O operation will force all the reset events, that are pending, to be presented. Whenever MVS causes a system reset to a channel path (e.g., via the RCHP instruction), an I/O operation is done to every device on the CHPID that was reset. This will avoid multiple recovery invocations for the same error. Subsequently, these events are discarded. Reset events are also ignored from devices that are off-line undergoing transition to the on-line state. Still as part of initialization, the SCP dynamically determines if the devices support the self description feature (i.e. whether they can provide CDRs in response to a RCD (as indicated in the aforementioned application, Ser. No. 251,969). The fact that a device supports self description is indicated by a bit in the UCB being set on (FIG. 1 at 101D). For each device that supports this feature, the self description information is read via RCD and stored in the CDT, via the previously described ADDCDR operation. See FIG. 10 for the resulting CDT for the configuration of FIG. 2. Paths to devices that support the self description feature but do not return the self description data (the I/O fails) or return "invalid" CDR data are not allowed on-line.

Assume now that the system operator inadvertently switches switch 217 from its connection to storage director 208 in subsystem 206, to a connection to storage director 213 in subsystem 212. As a result of this switching action, the set of devices on control unit 212 are conventionally signalled a system reset. The next I/O operation to any device in the subsystem over CHPID 04 (205) will result in the presentation of a reset event. (This is explained, for example, in the IBM 3990 Storage Control Reference manual, GA32-0099). Note that if the I/O were allowed to continue to the device as it is viewed from system A, data integrity would be lost.

Upon detection of the first reset event from a device on channel path 205 the system control program on system A conventionally invokes its recovery logic for all devices on channel path ID 04 (205).

Upon completion of normal reset event recovery, 1205, but before the devices are made available for normal system use, the device control blocks (UCBs) are checked 1206 to see if the device supports self description by checking the UCB bit indicated at 101D in FIG. 1. If the device supports self description, the SCP rereads the self description data using the RCD command 1208. If this I/O is not successful, the path is marked as "bad" and conventional bad path processing is invoked 1212 and the path is marked off-line. This conventional processing is described more fully in MVS/XA SLL IOS Part 1 (LY28-1705) and MVS/XA SLL IOS Part 2 (LY28-1706). This processing marks the path unavailable for normal use by the system. If the path is the last path to a device 1213, the device is also forced off-line and put in the "boxed" state 1214. This means that all I/O requests to the device are rejected by the SCP. The subchannel is disabled so that no further communication is possible from the device.

If the RCD I/O is successful 1209, the resulting CDR is added to the CDT 1210 by invoking the previously explained ADDCDR function. As indicated above, part of this processing wil' be to detect the nonmatch of the past and present TNED (FIG. 4 at 409) and set any error indication (410) in this case. Then, FIG. 12 at 1211, this error indication is sensed, and the "bad path" logic in invoked 1212 as previously explained to mark the path off-line, and force the device off-line if appropriate 1214.

While the invention has been described in terms of one embodiment and several examples, it is recognized by those skilled in the art that the invention is not limited to this embodiment and these examples. There are numerous system device configurations in which this invention can be used, and the data structure for nonredundant data storage may be profitably used for storing additional data, or different types of data, without departing from the spirit or scope of the invention as described and claimed.

What is claimed is:

1. In a data processing system having a host system with attached peripheral subsystems including a plurality of addressable devices, a switching error handling mechanism comprising:
A) configuration definition means for uniquely defining said addressable devices and paths thereto, said configuration definition means comprising configuration data;
B) reset event trigger means for causing a reset event on the occurrence of a switching action affecting one of said addressable devices;
C) reset event processing means for performing data integrity error recovery on detection of said reset event, said reset event processing means comprising:

i) read configuration data means for reading said configuration data associated with said one of said addressable devices, and ii) recovery action means for preventing loss of data integrity if said configuration data does not match a prior version of said configuration data.

2. The switching error handling mechanism of claim 1, in which the configuration definition means comprises a data structure containing said configuration data defining one or more paths to each of said addressable devices, in which each of said one or more paths comprises one or more nodes, and in which a full description of each of said nodes appears only once within said data structure.

3. The apparatus of claim 2 in which said data structure comprises a subsystem control block (SSCB) and one or more levels having node descriptor control blocks (NDCBs), each NDCB having a node element descriptor (NED) identifying one of said nodes and also having a token.

4. The apparatus of claim 1 in which said recovery action means comprises:

A) removal means for removing said one of said paths to one of said addressable devices, and B) means for forcing said one of said addressable devices off-line if said removal means has removed all of said paths to said one of said addressable devices.

5. In a data processing system having a host system with attached peripheral subsystems, at least one of said subsystems including a plurality of addressable devices, a method for detecting and recovering from switching errors comprising the steps of:

A) reading a first set of configuration data on a path to one of said addressable devices when said device is brought on-line;

B) storing said first set of configuration data non-redundantly in a configuration data table (CDT);

C) triggering a rest even on performing a switching action for said one of said addressable devices;

D) performing reset event processing on issuance of a next I/O operation to said one of said addressable devices following said reset event, said reset event processing comprising the steps of:

i) reading a second set of configuration data for said one of said addressable devices;

ii) comparing said second set of configuration data with said first set of configuration data;

iii) initiating a recovery action if said first set of configuration data does not match said second set of configuration data.

6. The method of claim 5 in which said configuration data comprises node element descriptors (NEDs) uniquely describing each self describing node on said path, and token node element descriptors (TNEDs) uniquely describing one of said subsystems, said one of said subsystems containing said one of said devices.

7. The method of claim 5 in which said step of initiating a recovery action comprises the steps of:

A) removing one of said paths to said one of said addressable devices;

B) forcing said one of said addressable devices off-line if said step of removing has removed all of said paths to said one of said addressable devices.

* * * * *